United States Patent [19]

Boys et al.

[11] Patent Number: 6,100,663

[45] Date of Patent: Aug. 8, 2000

[54] INDUCTIVELY POWERED BATTERY CHARGER

[75] Inventors: John Talbot Boys; Andrew William Green, both of Auckland, New Zealand

[73] Assignee: Auckland Uniservices Limited, Auckland, New Zealand

[21] Appl. No.: 09/180,189

[22] PCT Filed: May 2, 1997

[86] PCT No.: PCT/NZ97/00053

§ 371 Date: Nov. 3, 1998

§ 102(e) Date: Nov. 3, 1998

[87] PCT Pub. No.: WO97/42695

PCT Pub. Date: Nov. 13, 1997

[30] Foreign Application Priority Data

May 3, 1996 [NZ] New Zealand .............................. 286513
Sep. 17, 1996 [NZ] New Zealand .............................. 299396

[51] Int. Cl.[7] ........................................................ H02J 7/00
[52] U.S. Cl. ............................................. 320/108; 320/119
[58] Field of Search ..................................... 320/119, 108, 320/116

[56] References Cited

U.S. PATENT DOCUMENTS

| | | |
|---|---|---|
| 4,331,911 | 5/1982 | Park . |
| 4,496,896 | 1/1985 | Melocik et al. . |
| 5,245,267 | 9/1993 | Pierret et al. .............................. 320/119 |
| 5,254,930 | 10/1993 | Daly ......................................... 320/119 |
| 5,498,950 | 3/1996 | Ouwerkerk . |
| 5,594,318 | 1/1997 | Nor et al. . |
| 5,633,577 | 5/1997 | Matsumae et al. . |
| 5,646,504 | 7/1997 | Feldstein ................................. 320/119 |
| 5,659,237 | 8/1997 | Divan et al. ............................. 320/119 |

*Primary Examiner*—Shawn Riley
*Assistant Examiner*—Gregory J. Toatley, Jr.
*Attorney, Agent, or Firm*—Young & Thompson

[57] ABSTRACT

Loosely coupled inductive power for charging batteries is rectified from a first power pickup winding and the resulting current source is connected to a battery unit. Each current source is controlled by shorting a second resonant winding. Battery banks may be charged using multiple isolated position-tolerant pickups independently controlled according to the condition of the connected battery unit and by overall commands communicated over an isolated link. The battery unit may be a single cell. In a self-stabilizing bank or monoblock a primary inductive conductor is energized using all the cells, individual cells are separately monitored by control means and any below-average cell can be individually charged from the inductive conductor, thus correcting between-cell variations. The charge in all cells within a bank can be held within 30% to 70% of full charge and prevented from drifting towards full or empty during repetitive charge and discharge times.

11 Claims, 4 Drawing Sheets

INDUCTIVELY POWERED BATTERY CHARGER

TECHNICAL FIELD OF THE INVENTION

This invention relates to the field of battery charging apparatus and methods where individual cell charging can be controlled, and to transport, where it relates to electric vehicles using batteries that are charged by inductive power transfer.

BACKGROUND

There is considerable interest in electric vehicles (EVs) as pollution-free transport units, but the public has become so used to the convenience of gasoline as a fuel that the problems of electricity supply and storage still render EVs relatively unacceptable.

Providing power to an EV involves selecting a source. One extreme is where the vehicle carries its own energy on-board—the pure battery approach, with rechargeable batteries charged at a supply depot, and the other extreme is an immediate supply approach without the use of any storage battery at all, perhaps using a pickup brush rubbing on an electrified rail or an overhead wire, or using an inductive power transfer approach. (Some EVs may supplement these methods with solar generated power or occasional use of an on-board generator driven by an engine). Generally it is desirable to provide sufficient charge in a given vehicle to provide for a reasonable distance of travel. It is desirable to provide a convenient, "invisible" charging process so that the user simply gets into the vehicle as and when required, and goes off to a destination. Circumstances determine the most appropriate source selection from this range of choices of supply of power. It may be too expensive to electrify a route. At least some battery storage is preferred for most EVs, so that the vehicle can at least temporarily go off an energised route, and so that peak power levels can be provided at levels which exceed the rate at which power can be transferred from the stationary supply. Some vehicles may return power to the battery during regenerative braking; useful in hilly localities.

EVs supplied from stationary sources of electric power generally remain at a charging site for a period, charge up one or more on-board batteries, and then consume the stored energy during movement. Disadvantages of this process include the extended waiting time at a charging position, and the need to make a deliberate refuelling act from time to time in order to continue to travel. Apart from the disadvantage of relatively frequent refuelling, EVs also have technical problems related to the storage batteries themselves. The lead-acid battery is still by far the most commonly used kind even though novel types such as sodium-based cells have recently been developed—and abandoned—and lithium hydride batteries are now being developed. Lead-acid batteries are marginally acceptable for electric vehicle applications because under existing management regimes they suffer from the disadvantages of high weight, high volume, poor energy storage, poor energy density, poor cycle life, and high cost.

A less well appreciated but significant problem relates to those larger vehicles that employ a number of battery units or monoblocks wired in series. Typically the motors of these vehicles run at 100 or 200 V or more, largely to minimise switching costs and ohmic losses. The deleterious effects of either complete discharge or complete (over) charge of the lead-acid battery are well-known. The problem is further compounded by the inevitably differing coulombmetric efficiencies of a set of battery cells. If a series bank of cells is repeatedly charged then discharged, some cells will tend to drift to a fully charged state while others will tend to drift to a fully discharged state. The prior-art procedure used to equalise the charge in all units of a set is to fully charge the entire set until all batteries starts to 'gas'—when every cell in the battery is fully or 100% charged—but most are now overcharged and electrolyte is lost during gassing. For a typical EV, a full charging process is done once per day or overnight, with opportunity charging through the day. It is known that provided a lead-acid battery is maintained at a depth of discharge (DOD) of between about 30% and about 70% of its maximum capacity, it can be exercised through a very much larger number of cycles than if it is charged or discharged to its full capacity.

One difficulty in restricting duty to this 30%–70% range in multiple battery units is that individual units may vary so much in performance that if treated as a homogeneous battery bank over a number of cycles, some units may tend to reach a state of complete charge while others may tend to a state of complete discharge. Consequently the EV exhibits a limited range, and greatly reduced battery life. This problem might be overcome with a total battery care depot where the batteries of an EV are totally removed and replaced by replenished, checked batteries, or by including in each EV a host of individual floating chargers; one for each battery unit or monoblock, together with some means for sensing the state of charge, but providing that kind of charging means has hitherto been regarded as commercially infeasible.

Of course, applications other than vehicles may lend themselves to this type of battery management. For example, a power tool relying on a series of cells could be provided with a battery management unit of this type and so exhibit extended charge capacity and extended battery life. Telephone exchanges for example use banks of massive lead-acid batteries for backup power. The growing use of renewable energy may bring banks of storage batteries into domestic use, for holding excess energy collected from the sun or the wind and returning it for later consumption.

Object

It is an object of the present invention to provide an improved apparatus and method for managing battery charge in a rechargeable battery, or one which will at least provide the public with a useful choice.

Statement of the Invention

In a first broad aspect the invention provides battery charging means for a rechargeable battery unit comprising one or more cells; the battery charging means employing inductive power transfer between at least one primary inductive conductor capable of being energised at a high frequency, and a loosely coupled, resonant, secondary inductive pickup unit capable of supplying a corresponding battery unit with a charging current; said pickup unit including at least one inductor, resonating means, and rectifying means; characterised in that the pickup includes means for varying the coupling between the primary inductive conductor and the inductive pickup unit; the means comprising a shorting switch capable of shorting the at least one inductor from time to time so that the amount of electrical energy circulating in the resonant pickup unit is capable of being controlled and so that the amount of energy passed to the rechargeable battery unit is capable of being controlled.

In a related aspect the invention provides battery charging means as described above, wherein the pickup unit includes a first control inductor and a second power-handling inductor, the first inductor and the second inductor being inductively coupled with each other so that when the first inductor is in a short-circuited condition the second inductor is substantially decoupled from the primary inductive conductor.

Preferably the first inductor is comprised of many turns of litz wire, and the second inductor is comprised of a flat conductive sheet; preferably a flat litz cable or alternatively a solid metallic strip.

In another related aspect the invention provides battery charging means as described above, wherein the pickup unit includes control means for controlling the amount of coupling between the primary inductive conductor and any one pickup winding; the control means being capable of determining the state of charge of the rechargeable battery and, by acting on a short-circuiting switch capable of short-circuiting the first inductor, the control means is capable of providing or not providing further charging current so that the charge in the rechargeable battery is capable of being controlled.

In a further related aspect the invention provides battery charging means as described above, for use with at least one primary inductive conductor and a bank of rechargeable batteries made up of a plurality of battery units; each battery unit being provided with associated battery charging means, wherein the control means is capable of determining the state of charge of each battery unit within the bank and is capable of providing or blocking further charging current to each battery unit so that the state of charge of the corresponding battery unit is controlled and so that the state of charge is equalised throughout the battery units of the bank.

Preferably the state of charge is controlled during charge, storage, and discharge although optionally its activity may be restricted.

In yet another related aspect the invention provides a battery monoblock with battery charging means as described above, wherein the charging and control means is capable of drawing its operating power internally and the charging and control means has a self-stabilising property; whereby the control means is capable of determining whether any single cell holds less charge than any other cell, and the control means is capable of allowing charge to be added to any single under-charged cell so that all cells are brought to the same state of charge, or depth of discharge (DOD).

In a subsidiary aspect the invention provides a monoblock incorporating battery charging means as described above, wherein the charging and control means is physically included within the monoblock.

In a still further related aspect the invention provides a vehicle at least partially powered by at least one electric motor, in which the electric motor draws power from a rechargeable battery bank capable of being charged from battery charging means as described previously.

In a yet still further related aspect the invention provides battery charging means as described above, having an electric power storage module including power collection means capable of collecting energy from a renewable resource, and a rechargeable battery bank capable of storing the collected energy and releasing it to a power conversion device, characterised in that the rechargeable battery bank is capable of being charged and/or stabilised from battery charging and controlling means as previously described.

In a further related aspect the invention provides battery charging means as described above, wherein the controller substantially maintains the charge between predetermined limits appropriate to the type of rechargeable battery in use.

In a more specific aspect the invention provides battery charging means as described above, wherein the rechargeable battery is a lead-acid storage battery and the controller substantially maintains the charge between predetermined limits, being an upper limit of about 70% of full charge, and a predetermined lower limit of about 30% of full charge, so that the lead-acid battery has an enhanced lifetime.

In yet another aspect the invention provides battery charging means as described above, wherein the control means is capable of detecting or anticipating failure within the rechargeable battery bank.

In a subsidiary aspect the invention provides battery charging means as described above, wherein the control means is capable of recording the performance of the or each battery unit.

In a second broad aspect the invention provides battery charging means for a bank of rechargeable batteries; the battery charging means employing inductive power transfer between at least one primary inductive conductor capable of being energised at a high frequency, and a plurality of resonant, secondary pickup windings; each winding being capable of supplying a corresponding unit of the bank of rechargeable batteries with a charging current, wherein there is means for controlling the coupling between the primary inductive conductor and any one pickup winding; the controlling means being capable of determining the state of charge of the corresponding battery unit and of providing or blocking further charging current so that the state of charge of the corresponding battery unit is controlled and so that the state of charge is equalised throughout the units of the bank.

In a related aspect the invention provides battery charging means as described above, wherein the resonant secondary winding provided with controlling means is effectively coupled to another substantially non-resonant secondary winding comprising a relatively low-voltage high-current winding, which is connected to rectifying means and then to a battery unit.

In a further related aspect the invention provides battery charging means as described above, wherein the control means is also capable of responding to the state of charge of the other battery units and modifying its response accordingly.

Preferably each supervisory means includes voltage and current measurement means and an algorithm for battery supervision which algorithm is relevant to the characteristics of the type of battery used.

Optionally, means for sensing failure or imminent failure of an identified battery unit may be employed to provide improved reliability.

Preferably the supervisory means corresponding to each battery unit is linked to other supervisory means by communications means.

Alternatively the battery bank may comprise just one battery and one unit of the invention.

In a further broad aspect the invention provides a method for maintenance of a bank of batteries, in which the method comprises the steps of separately charging up to a set level of charge, and separately discharging down to a set level of charge each monoblock or unit of the bank regardless of the amount of charge required to bring other monoblocks up to a set level of charge, so that the behaviour of any particular monoblock or unit has no effect on the remainder of the bank.

DRAWINGS

The following is a description of a preferred form of the invention, given by way of example only, with reference to the accompanying diagrams.

PREFERRED EMBODIMENTS

On a large scale, as for charging a bank of monoblocks in electric vehicles, loosely coupled inductive power for charging each monoblock is rectified from a first pickup winding exposed to a varying magnetic field, and the resulting current source is connected to the monoblock. Many monoblocks can be charged from one primary conductive pathway while being individually controlled, using a procedure that shorts out a second secondary winding within the same pickup unit when the circulating secondary current is high, or the battery charge is full. The effect of the short circuit is to magnetically isolate the shorted pickup so that the primary current is not affected by the shorted pickup and other pickups are not affected. Thus one primary conductor can service a number of pickup units.

On a small scale, the invention can be applied to a single cell of a monoblock. In order to provide a long battery life (in the case of lead-acid batteries at least) it is desirable to hold the charge in all cells between 30% to 70% of full charge. During repeated charge and use cycles, different cells may drift towards the fully charged state, or may drift towards a discharged state as a result of manufacturing tolerances or the like resulting in differing coulombmetric efficiencies. A self-stabilising monoblock is described, in which an internal primary inductive conductor is energised using all the cells, individual cells are separately monitored and can be further charged from the local primary pathway, thus correcting between-cell variations. This monoblock has the two usual post connections to the outside world, though it may have a further control or communications link such as an optical fibre, used for control or reporting purposes. The expense of providing sealed-in electronics of this type is compensated for by increased battery life. It should be noted that some individual cells are very large, such as those used in telephone exchanges for a DC supply.

Preferred Embodiment (1)—Electric Vehicles.

This invention employs the special properties of inductively transferred power in order to minimise the costs of providing a separate battery charger for each of many individual monoblocks of a battery bank for an inductively powered electric vehicle. These special properties include:

high frequency operation (10–25 kHz) and no primary cores, loose coupling between primary and secondary conductors (allowing non-accurate placement), compact, cheap secondary pickup units, resonant secondary windings (hence providing a constant-current type of output, suitable for charging batteries), and output control by shorting a secondary winding; a practice which does not involve a great deal of power loss in a series switch.

Figure 1:
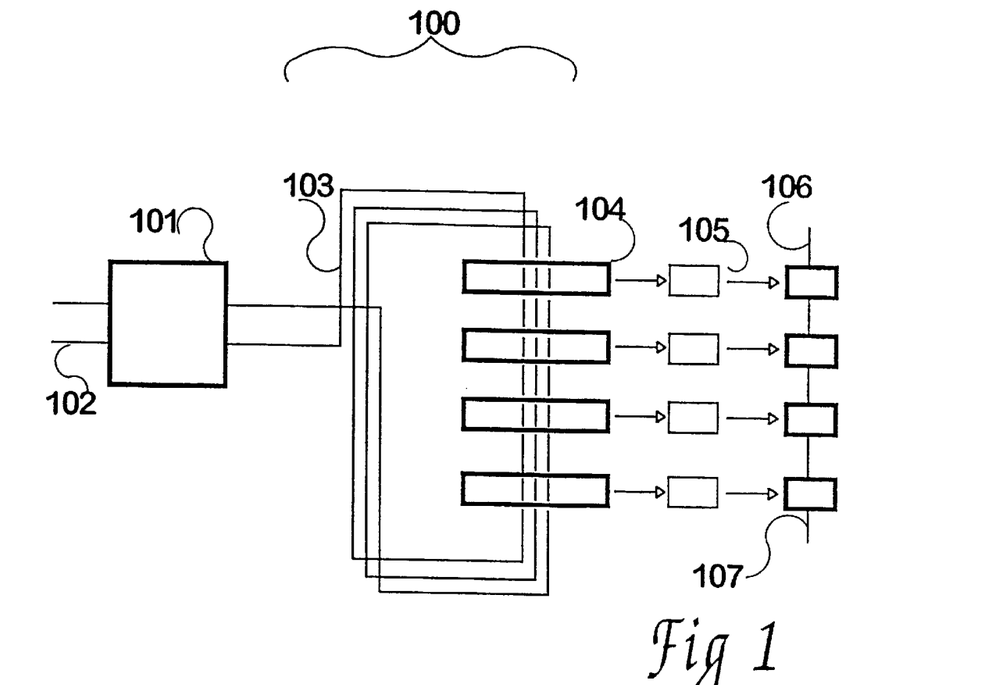
FIG. 1: is a diagram of a primary (fixed) and a secondary (mobile) winding disposition suitable for an electric vehicle, as seen from above.

An IPT battery charger suitable for electric vehicles comprises a multiplicity of IPT pick-up coils (104 in FIGS. 1 and 2, 304 in FIG. 3) in the vehicle with each coil preferably provided with a ferrite flux-enhancement core to collect more flux, and tuned by means of a resonant capacitor 305 to a common operating frequency. The pick-up coils are powered from the inductive field surrounding a line or loop or coil of litz wire 103 buried in the roadway (or in the floor of a garage or parking place). The primary is preferably also resonant, and typical values for primary Q are 1.5 to 3. A generic circuit for powering a primary inductive pathway of any size is given below the label 101 in FIG. 8. There are a number of techniques for controlling and for extending the amount of primary conductor that is energised at any one time. Details of these techniques have been dealt with in previously published patent specifications by these authors. In turn the primary coil is powered from an adequate high-frequency power supply 101 and preferably this can generate perhaps 40 kW for charging a bus-sized vehicle at 10 kHz which is a preferred frequency at this time. Presently available switching devices are unduly expensive for higher frequencies than 10 kHz, yet higher frequencies permit more compact inductive power transfer devices. There may be some 450 A/turns of circulating primary current in the resonant primary coil. Of course, the primary conductor does not need to be resonant but it is useful (for reducing radiation of harmonics and for easily generating a high-frequency current) if it is resonant.

Figure 2:
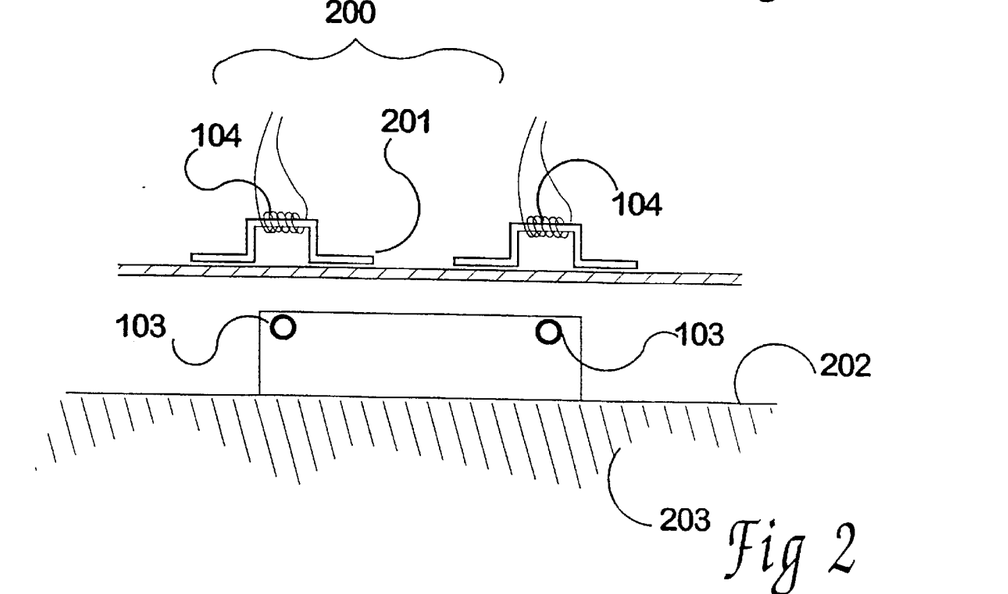
FIG. 2: is a diagram of a primary conductor and a secondary winding disposition suitable for an electric vehicle, shown in sectional elevation.

The primary windings are preferably contained in a concrete or other slab 202 so that the coil is some distance above the rolling surface for the vehicle. Alternatively the coils may be embedded in slits in the floor or roadway and may protrude (inside a mechanically protective shield) from beneath the vehicle. Preferably there is at least one coil provided under the EV for each unit of the storage battery. By "unit" we may refer to single cells or to groups of perhaps 3 or 6 cells. If more than one secondary coil per unit is provided it may be possible to scatter the pickup coils about the vehicle so that the chance of intercepting an inductive field is raised and the best placed coils of a large number of options can then be selected automatically. Alternatively it may be helpful to provide wheel guides or automatic guidance or the like so that the driver of the vehicle can position the vehicle substantially over the primary windings.

Figure 3:
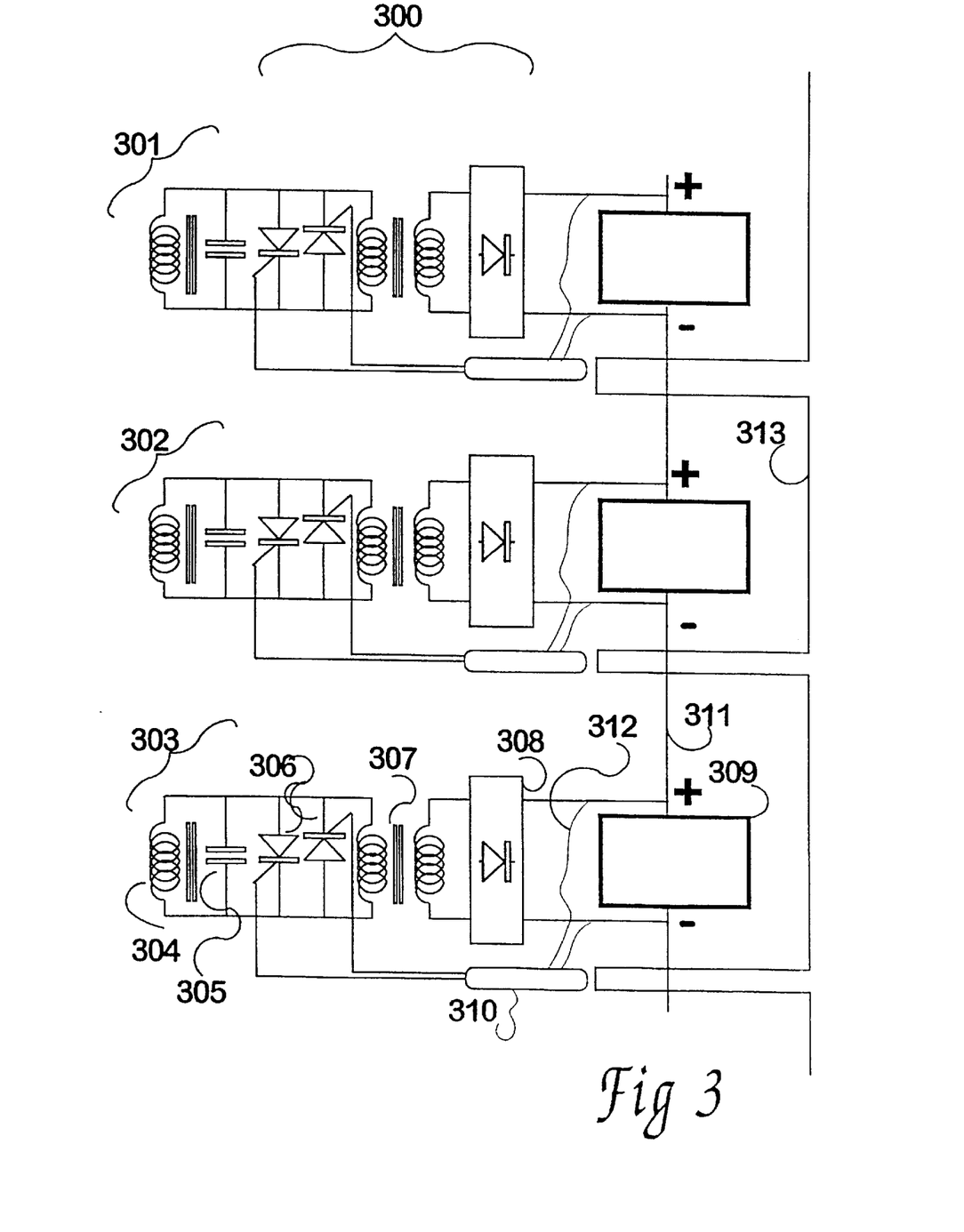
FIG. 3: is a block circuit diagram of a charger section according to the invention, suitable for an electric vehicle.

We prefer to provide a number of pickups in order to have a floating and individually controllable secondary for each unit of the battery bank, to allow for individual failures, and to reduce the need for precise EV positioning. The actual air gap should be small to improve the coupling but large enough so that there is no risk of physical interference between the concrete slab and the pick-up coils. In practice a gap of say 75 mm would suffice and allow for interference-free charging even if the vehicle had one flat tire. A typical pickup would have a ferrite flux concentrator that is typically 250–400 mm across and 100 mm long. As in our previous applications, each secondary pickup unit, examples of which are shown in FIG. 3 as 301, or 302, or 303, has the usual pickup coil 304 (or 104 in FIGS. 1 and 2), and a ferrite flux concentrating core shown as 201 in FIG. 2, or in section as 201 in FIG. 6.

A resonating capacitor 305 forms a resonant circuit with the pickup coil. A shorting device (here by way of example a pair of opposed silicon-controlled rectifiers 306) is employed in order to enable, or to disable (when shorted) the pickup device, so allowing independent control of each pickup unit 301, 302, or 303. A shorted pickup device provides no output power and, having at that time no circulating currents either, presents no barrier to the passage of primary power in the primary conductor past the site of the shorted pickup. After passing through an optional step-down transformer 307 (for we expect that it will be more efficient to have high circulating voltage in the secondary windings) the output of each pick-up is rectified by a Schottky rectifier bridge 308 or the like and allowed to charge one of the monoblocks 309 in the vehicle's battery.

Figure 4:
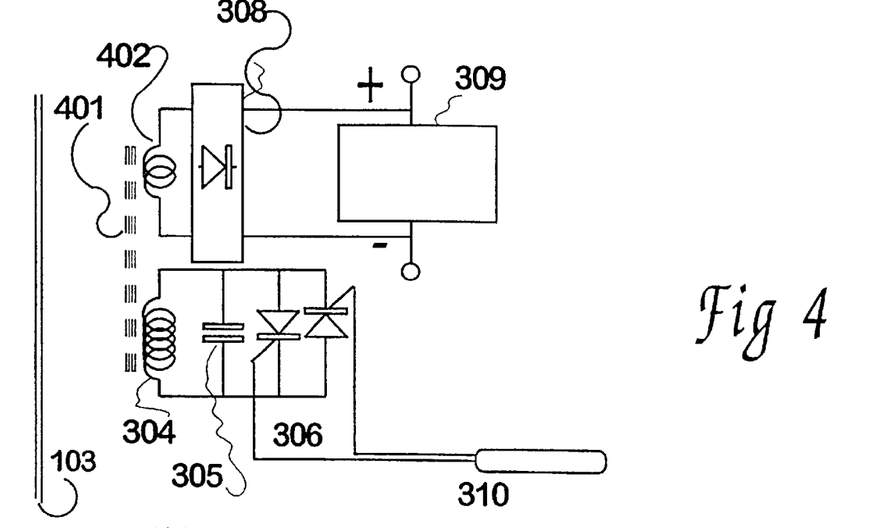
FIG. 4: is a circuit diagram of a preferred pickup unit with a separate control winding, suitable for a load such as a rechargeable battery.

An alternative dual-coil configuration; where one resonant coil is controlled and the other simply supplies a DC current through a rectifier is the resonant coil is not shorted, is now described. Refer to FIG. 4, which shows a control winding 304 and a power collection winding 402 in a relatively tightly coupled relationship; here sharing a ferrite core 401. The control winding has a relatively large number of turns, so providing a high voltage and needing a smaller resonating capacitor to meet a given resonant frequency than a power coil providing a low voltage (3–15V at perhaps 200 A) The control winding is equipped with a shorting switch of relatively low current capacity, such as a pair of silicon controlled rectifier units 306 in reverse parallel, or perhaps a rectifying bridge connected to a single power FET 310 or the like.

The non-resonant high-current winding 402 may have one or a few turns, and current from the high-current winding is directly rectified (Schottky bridge 308, discrete units 503 and 503R (reverse)), and passed to the battery unit. When the resonant winding is in a shorted state it has the effect of shielding the high-current winding from the inductive field, so halting power transfer. Shorting is an effective method for limiting peak secondary resonating currents which may interact with primary current transfer, and to interrupt the battery charge process once a suitable level of charge has been reached.

Figure 5:
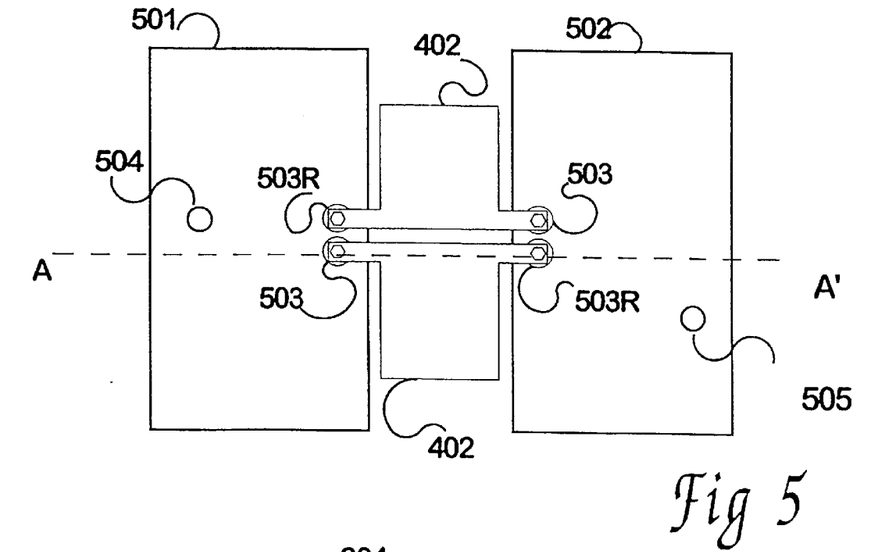
FIG. 5: is an illustration as seen from above of a preferred pickup unit according to FIG. 4.
Figure 6:
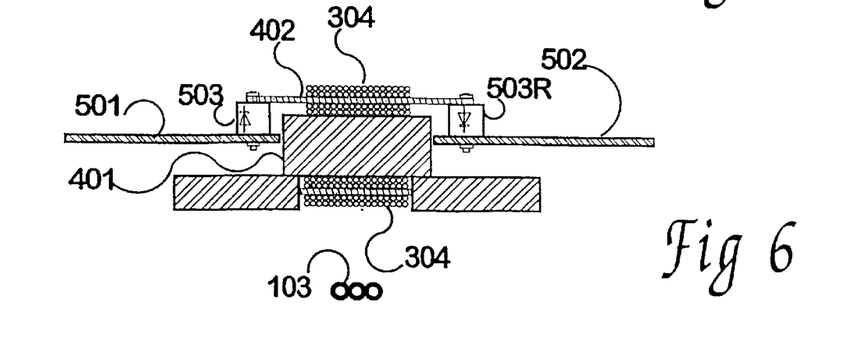
FIG. 6: is a cross section (elevation) derived from FIG. 5, along the lines A–A'

A physical layout for a battery-charging inductive pickup is shown in FIGS. 5 (top view) and 6 (cross-section along the lines A–A'). In FIG. 5 we have not included the control windings for the sake of clarity. A first version of the power winding comprises a single turn composed of copper sheet, having lugs at each end that project sideways from the pickup assembly and connect with stud rectifiers 503, and 503R. Preferably these are the Schottky type or similar, offering fast recovery and low forward voltage drop. These stud rectifiers are orientated so that a bridge rectifier configuration is provided. The aluminium sheets 501 and 502 have the functions of (a) providing a connection point for the DC output (at holes 504 and 505), (b) providing heat dissipation from the rectifier diodes 503, 503R bolted onto it, (c) reflecting magnetic flux downwards and onto the ferrite core (and so shielding the regions above), and (4) providing support for the control unit (not shown). FIG. 6 does include the control winding, here shown in section 304 on both sides of the power winding 402, and both wound over the ferrite elements 401 of a flux-collecting assembly of ferrite modules which may be a series of fingers, or larger lumps as shown here. 103 represents three conductors of a primary conductor, creating a magnetic flux for collection by the inductive pickup.

We found that when used in high-power applications a substantial amount of current (750A) circulated around the outer surface of the copper sheet, over the end, and back along the inner surface of the copper to the other end, while only about 200 A was extractable. Consequently noticeable heat was generated. This problem can be overcome by using flat litz wire, or the like, having a suitable cross-sectional area. We prefer to use two strips of flat litz wire each wound as a single turn and placed side by side; each of the four ends being brought out sideways and away from the concentrated magnetic field, where the conductors of the litz wire are soldered together within a suitable lug or other terminal that can be connected to one of the diodes as shown in FIG. 5.

Charging Currents

In this industry charging speeds are referred to as "Level 1", for an overnight kind of "trickle" charge over 8 to 15 hours, "Level 2" for a 3–8 hour charge, and "Level 3" for a fast charge taking only 10–20 minutes. Slow charges are generally better for the batteries, though different kinds of batteries can tolerate markedly different charging rates. Level 1 presents a smaller load to the electric utility supply, but could take inconveniently long. We generally select a charging level or speed according to the type of power available at a site. A home would generally be limited to 1.5–2.5 kVA from a single phase, 117 or 230 V outlet. A three-phase outlet could be provided as an alternative and cater for Level 2 charging rates; three-phase 220 to 480V power in domestic housing is infrequent but can be installed. If a number of homes install higher power capability this might cause the utility company to have to re-plan its distribution. Utility companies may prefer overnight charging operations. Three-phase power would normally be available in industrial buildings such as might house a transport operator. Level 3 charging might in practice be rather restricted in application to perhaps ambulances where immediate and urgent re-use of an EV is always likely.

Under-road installations, for "topping up" a charge as the vehicle proceeds along a road or is held up in a queue of traffic may be somewhere between Level 2 and Level 3 in order to balance the likely city usage of an EV which is sometimes within a charging inductive field or sometimes away from it. Three-phase power is already available in most city streets. The absence of a core in the primary side allows the circulating current to rise without risk of saturation, and the highest rate of charging that can be provided at any site can be set somewhere between a level 1 condition and a level 3 condition simply by controlling the amount of circulating current flowing in the primary, which in turn determines the current that the constant-current secondary can supply, without the use of further switches or inefficient regulators. The shorting switch approach used in these inductive power transfer circuits is a low-loss switch.

In order to render the procedure of charging as automatic as possible, each vehicle would presumably be fitted with means to log and charge for its electricity consumption An on-board meter through which power from all sources—home charging bay or under-freeway "top-ups" flows and is logged—and paid for from time to time may be used, but this could be interfered with. Preferably a fixed meter at the primary side is used together with a protocol involving interrogating a transponder within the vehicle in order to ascertain its identity and credit rating, moving the power, and then notifying the power utility company of the transaction. The user is charged for the increase in power consumption over the base rate, and under this arrangement inefficiencies in transfer are the responsibility of the user.

Particular applications for the technique are in 'Park-and-Ride' schemes and with automatically guided vehicles where a route consists to say 10–12 minutes driving followed by 10–12 minutes recharging with a regular 30 minute schedule to be maintained. Buses or vehicles would be guided over the main loop so that the pick-ups were favourably aligned to give good performance with relatively large air-gaps. The system could also be programmed to do a full charge on a weekly basis to keep the individual cells in the monoblocks at peak performance. For personal vehicles (cars) this last feature would also allow a full charge 'on request' where it was known that a larger than usual trip was planned for the next discharge cycle. The 10–25 kHz resonant power supplies preferred for this type of inductive power transfer typically have an input power factor close to 1.0 which is a desirable attribute for an electricity utility company.

Typical charging currents may be of the order of 180 A for a monoblock comprising a 6 or a 12 volt set of cells. This corresponds to a charging power of 2 or 3 kW.

Operating Method:

According to this invention, each lead-acid battery monoblock is charged independently so each one can be charged to the 30% DOD every time (conditions permitting) and no more. A charge equalising procedure may not be needed. The loosely coupled IPT technique allows this option to be achieved at reasonable cost whereas otherwise it would be prohibitively expensive. With this type of IPT circuit, the supply to the battery is at substantially a constant current which can be tailored to suit the requirements of the monoblock by physical design or by primary current control, rather than by active control with series or shunt regulators. Each monoblock can be switched hard on or hard off by shorting its resonant circuit (a procedure which involves surprisingly little current sinking) and can be regulated as a "bang-bang" controller. The charging current for a 40 kW bus application might be about 170 A per six volt monoblock. Normally the microprocessor will repeatedly assess the current flowing through each individual monoblock and compare this with instructions passed through an optically isolated RS485 link (313) so that the modes of all microprocessors can be changed if required and so that fault reports, trends in battery unit condition, and the like can be made available. Alternatively, each controller could work alone. Lead-acid batteries are at present marginally acceptable for EV applications and suffer from many disadvantages, thus a battery management system that can optimise their performance is likely to be fundamental to making an EV an economic proposition. For lead-acid batteries the current thinking is that the batteries can be cycled between 30% and 70% depth of discharge (DOD) for a virtually unlimited number of cycles. Deeper discharge is likely to cause problems (although from time to time it may inevitably occur) and higher charges are also a problem both with respect to cycle life and with charging rates which must be reduced or the battery will overheat.

If individual cell (2-volt units if lead-acid) terminals are available, the equalising controller can conveniently read the voltages of a series of these through a multi-channel A-D input. If each cell has its own source of charging voltage, these can then be controlled so that the entire battery bank is maintained at a consistent level of charge. An equalising controller may adjust individual cells relative to each other within a monoblock. It may equalise by providing supplementary charging currents (say 10% of the working currents) to those cells that are lagging behind. (The equalising controller is described below in more detail). It may however be optimal to regard the minimum unit as a monoblock of a 6 or a 12 volt set of cells.

Charge assessment may be by inferring internal resistance measurement, by examining the electrolyte, or by other means more appropriate to a preferred type of storage battery. If the current resonating in the secondary coil rises too much and may re-radiate an inductive field that can interfere with primary current flow, the shorting switch can be closed so that the secondary current is halted. Normally the microprocessor will endeavour to return the monoblock to 70% of maximum charge and then hold the shorting switch closed, cutting off the flow of current.

The microprocessor (see below) may then impose a nearly always ON duty cycle initially, and finishing up with a nearly always OFF cycle. Voltage and current measurements during charge, and voltage measurements during the OFF portions of the cycle will indicate to the controller the state of charge. Each monoblock would further have its own microprocessor to monitor the charge and record the coulombmetric efficiency so that accurate records would be available to spot errant cells. Lead-acid batteries can be brought up to a fuller charge using pulse charging rather than steady currents. The battery could be cycled through several cycles always coming up to the 30% DOD but measuring the on-charge and off-charge voltages to keep records of its dynamic resistance. Alternatively there might be a requirement to override the 30% level and force a full charge. The whole charging process would be completely 'intervention-free'. A system for billing the appropriate customer for electricity consumed may be included. Faulty cells can be identified even before failure, perhaps as an increase in internal resistance. Failed cells may be taken out of the bank either by manual disconnection/bridging or by automatic disconnection.

Preferred Embodiment (2)—Self-Stabilising Monoblock Units.

This section describes application of the invention to every single cell of a monoblock so that the charge in all cells of the monoblock can be held within 30% to 70% of full charge despite repeated charge and use cycles. A monoblock incorporating this invention can be termed a self-stabilising or a charge-balancing monoblock. Of course the invention can be applied to forms of storage battery that are not packaged as monoblocks—for example large banks of large cells such as are used in telephone exchanges can also be stabilised in the same way.

An external charger (which may also be driven by inductive power) provides most of the charge while the self-stabilising feature provides a small amount—perhaps 5%—more charge to those cells that remain under-charged, typically taking the energy from the bank as a whole. Even during discharge, a cell that is discharging more quickly than the average rate can be supplemented by drawing current from other cells within the monoblock. A self-stabilising monoblock could be always stabilising itself when in use, or when on the shelf (unless the stabilising feature is disabled). One simple disabling control may be to turn off a lamp connected to an optical fibre 708 received in an optical receiver module that has the effect of disabling a power converter 101 in FIG. 8. Thus, only if the battery is installed in a functioning battery bank where light goes down the optical fibre will the self-stabilisation feature be activated. Of course, the optical fibre can be used for more sophisticated communications such as reporting on the status of individual cells, reporting current drain, and the like. Note that in both FIGS. 7 and 8 only some cells and associated modules are shown for simplicity. While in FIG. 8 only one module 808 is shown (wherein the cell 705 is one part of the monoblock 309) there would in practice be typically six units each like 808 having a control and a power winding on a physically and inductively separate pickup core.

A self-stabilising monoblock according to the invention includes a resonant converter (FIGS. 7 & 8—101) to convert DC, usually obtained from across all the cells of the monoblock 309, into AC at perhaps 10 to 50 kHz. The converter shown in FIG. 8 draws DC power through a series inductor 802 to render the input a current source, and a centre-tapped DC splitting inductor 806. There is a resonating inductor 807 in series with the primary conductor 103, a resonating capacitor 805, and a pair of switches 803 and 804 which are normally driven by the controller 701 in a complementary fashion with reference to a sensed voltage from the line 809 (so that frequency is internally determined by the resonating components 805 and 807. Perhaps the DC splitting inductor 806 and the resonating inductor can be combined—perhaps even the primary conductor 103 can be modified with a centre tap and a number of turns so that the conductor 103 replaces both 806 and 807. The primary inductive conductor may in a car-battery sized monoblock be conceptual—a set of inductors may be positioned upon a single circuit board so that each one can be separately controlled by internal shorting without affecting nearby modules, and sense (702) and charging (707) conductors are taken from the board to reach all between-cell connectors. These conductors allow for separately charging and for monitoring individual cells and there may be one or more temperature sensors as well, because if voltage is used as the discriminant of charge status, temperature has an effect on readings. If on the other hand the monoblock is large the primary conductor 103 may be extended over tens or hundreds of meters.

Figure 7:
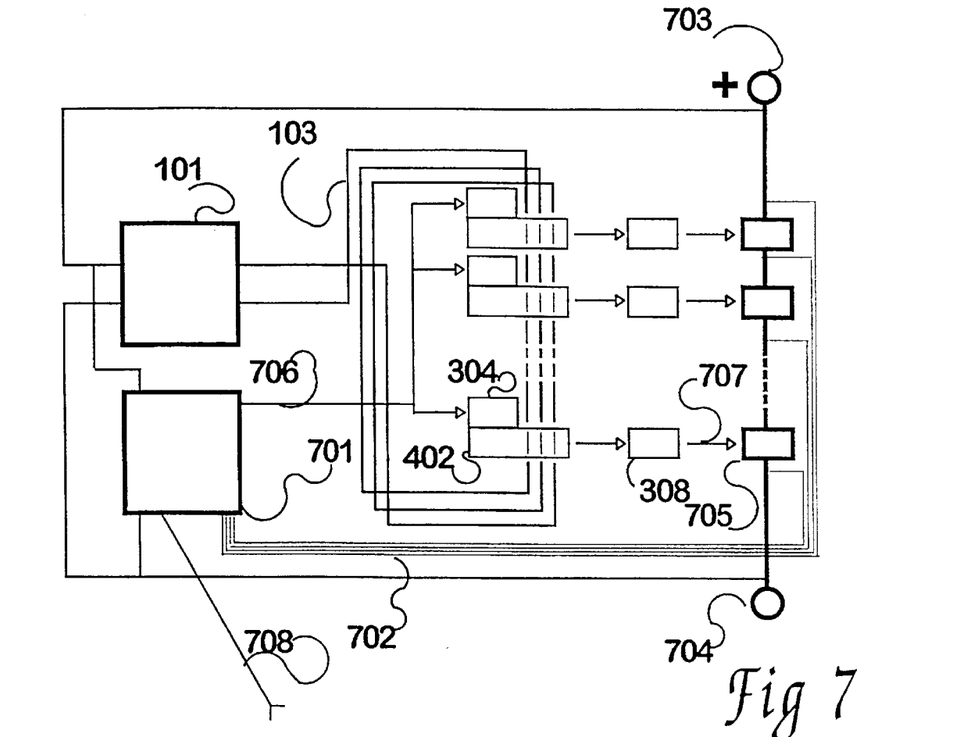
FIG. 7: is a block circuit diagram for a self-stabilising, monoblock battery according to the invention.
Figure 8:
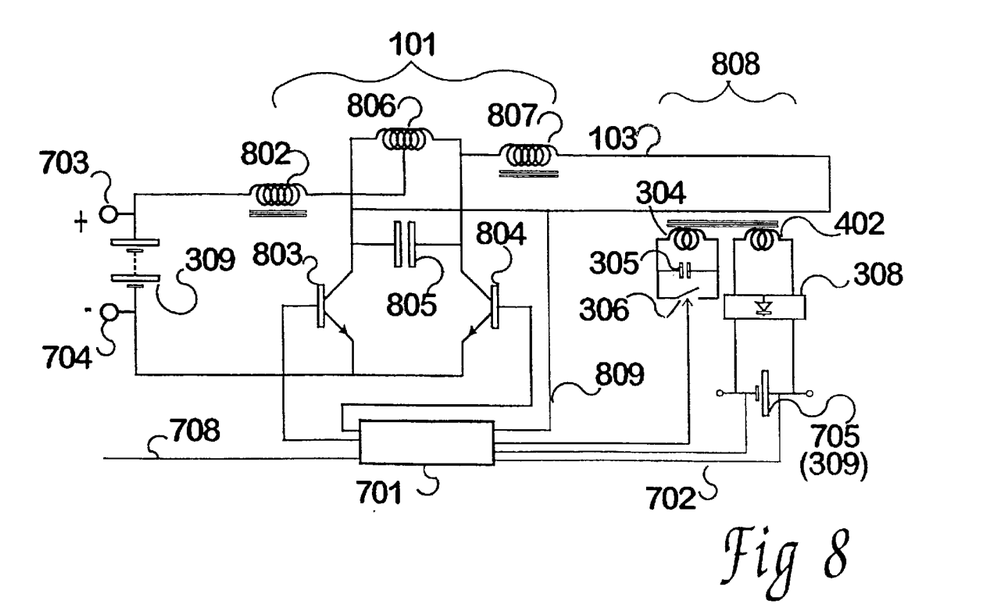
FIG. 8: is a more detailed circuit diagram for a self-stabilising monoblock battery according to the invention.

The monoblock has as usual a positive and a negative connection (703, 704) to the outside world, and the stabilising feature may be entirely internal. A communications link such as an optical fibre 708 could be provided for control (eg disabling during long-term storage) or for reporting purposes; such as for notifying the existence of a faulty cell to a logging means. Generally, battery manufacturers prefer not to provide extra connectors to a monoblock, so that a sealed-in set of electronics is likely to be preferred. Effective potting also protects the electronics from exposure to corrosive electrolyte. The expense of providing sealed-in electronics of this type is compensated for by increased battery life. Furthermore, replication of circuits should provide economy of scale. It should be noted that some individual cells are very large, such as those used in telephone exchanges for a DC supply, yet the same circuitry can be used.

Controller:

A controller 701 is preferably provided to manage the internal parts of a monoblock. In one embodiment, it would be provided with inputs 702 including the voltage across each cell and the monoblock temperature, preferably also at least a total current measure if not also the charging current fed to each monoblock. Current measurement may allow internal resistance to be measured, or allow cell voltage to be measured even when under load. Typically there would also be controls 708 from the outside world so that the resonant converter can be inhibited for example. Outputs from the controller include a line to separately inhibit each individual charger (by shorting it at 306). One advantage of the invention is that the inhibit line, taken to the gate of a shorting switch, can be floating with respect to the particular cell to be charged. Typically this controller would be a conventional microprocessor having analogue inputs and a program memory holding an operating program. In another embodiment a separate controller 701 may be provided for each cell, more likely if individual cells are large or if the cost of a separate controller is less than the complexity of providing inputs from and controls to a bank of modules each running at a separate offset voltage.

Operating Method:

During external charging (which may itself be by inductively coupled power) the internal stabilisation charging may be disabled, but preferably the sensing means is still capable of reporting whether or not the average of the monoblock has reached 30% DOD during a charging operation, so that charging of that monoblock can be halted.

After external charging, the internal controller in the monoblock would review all cell voltages in relation to temperature and regard any low voltages as indicating cells which are not sufficiently charged. It would then apply an extra charging current to those cells, checking the state of charge from time to time, and drawing power from the bank of cells within that monoblock itself. A process of this type is described in more detail in the previous section. This balancing procedure may also be used during the consumption of power from the monoblock, so that no cell is discharged by too great an amount, although it may be sufficient to apply the self-stabilising feature only after an identified charging procedure. In some applications, normal use may immediately follow a charging session, so preferably the stabilisation method can be functional during use in whatever operating conditions are expected.

Fault Reporting:

In the event of detecting an evidently faulty cell, the controller may be equipped with reporting means to alert an external supervisor that a certain cell is faulty and may be replaced. In general use, entire monoblocks are usually replaced because of premature failure of unidentified single cells. If replacement can be focused on the failed cell, overall life is increased. The controller may at least be provided with an inhibit feature so that it halts the resonant power converter and puts the microprocessor into a sleep mode during periods when the monoblock is not in use.

The main advantage of this self-stabilising feature is that no cell is allowed to drift in its charge from between 30% and 70% depth of discharge. All cells are always used within their best range of charge and so battery life is extended. In present-day applications the problem is generally avoided by overcharging so that all cells eventually can take no more charge, but that involves gas release and the adverse effects of electrolyte depletion, causes overheating, violates the 30–70% DOD life-enhancing practice, and consumes a significant amount of extra time and energy.

Variations

Although this specification has concentrated on lead-acid batteries, the particular characteristics of other types of rechargeable battery, such as those based on lithium hydride technology, may be catered for in a battery management system of this type. Charging rates, float currents, deep discharge, and the like can be handled. Applications other than vehicles can be considered, such as stationary battery banks in composite renewable energy installations where sunlight or wind energy is stored for later use. Details of the circuitry may be varied.

Advantages

Inductively transferred electric power, in a loosely coupled system as described in this specification inherently comprises a current source which is preferable to a voltage source for battery charging purposes. Additional components to convert a voltage source into a current source are not required; saving in cost and in efficiency and permitting replication for single-cell delivery and control.

Each module (as per FIG. 4) can be electrically isolated so that a number (which may be 20) of identical modules may be used simultaneously to charge an entire bus battery bank running on nominally 240V DC (prior to conversion).

The pickup uses a shorting system for control, which is efficient and which allows more than one module at a time to draw power from the same primary conductor, so that one source of power can be used to charge up an entire battery bank using multiple charging units.

The controller can closely control the charge in each cell so that all cells are limited to a 30–70% depth of discharge in normal operation, so extending the life of the battery and/or allowing battery design to be optimised for this pattern of use.

A "self-stabilising monoblock" intended as a replacement for a conventional monoblock internally duplicates the above IPT circuitry. When (optionally) operating in a self-contained environment it can adjust the charge in one cell at the expense of the others.

International compatibility of vehicles using inductively transferred electric power, irrespective of the local utility power supply.

Finally, it will be appreciated that various alterations and modifications may be made to the foregoing without departing from the scope of this invention as set forth.

We claim:

1. A battery charger for a rechargeable battery having one or more cells, the charger inductively transferring power from at least one inductive conductor energized at a high frequency, the charger comprising:

a resonant inductive pickup unit providing to the battery a charging current that is inductively transferred from the at least one inductive conductor to whom said pickup unit is coupled, said pickup unit comprising a first control inductor and a second power-handling inductor, a resonating capacitor, and a rectifier;

said first and second inductors being inductively coupled with each other so that when said first inductor is short circuited said second inductor is substantially decoupled from the at least one inductive conductor;

said pickup unit further comprising a shorting switch varying the coupling between the at least one inductive conductor and said pickup unit by shorting said first inductor to control an amount of energy circulating in said pickup unit and an amount of current passed to the battery.

2. The charger of claim 1, wherein said pickup unit further comprises plural pickup windings and control means for controlling said shorting switch to vary the coupling between the at least one inductive conductor and one of said plural pickup windings.

3. The charger of claim 2, wherein said control means determines a charge of the battery and controls said shorting switch responsive to this determination.

4. The charger of claim 2 for charging a bank of a plurality of the batteries, wherein said control means determines a charge of each of the batteries and equalizes these charges.

5. The charger of claim 2 for separately charging each cell of the battery, wherein said control means determines a charge of each of the cells and equalizes these charges.

6. The charger of claim 5 physically located within the battery.

7. The charger of claim 2, wherein said control means controls the battery charge so that the battery is charged at 30% to 70% of full charge.

8. The charger of claim 2, wherein said control means detects a failure in the battery.

9. The charger of claim 2, wherein said control means records battery performance.

10. A vehicle powered by an electric motor, comprising the charger of claim 1 that provides the charging current to the rechargeable battery that powers the electric motor.

11. An electric power storage module that collects energy from an energy source, comprising the charger of claim 1 that provides the charging current to the rechargeable battery that stores the collected energy.

* * * * *